United States Patent

[11] 3,592,125

| [72] | Inventors | Robert J. Tolmie<br>Fairfield;<br>Robert L. Rubenstein, Norwalk; Theodore R. Flowers, Fairfield, all of, Conn. |
|---|---|---|
| [21] | Appl. No | 804,159 |
| [22] | Filed | Mar. 4, 1969 |
| [45] | Patented | July 13, 1971 |
| [73] | Assignee | Sperry Rand Corporation<br>New York, N.Y. |

[54] AUTOMATIC INFUSION BREW MAKER
15 Claims, 11 Drawing Figs.

[52] U.S. Cl. ............................................. 99/307, 99/295
[51] Int. Cl. .............................................. A47j 31/00
[50] Field of Search ............................................. 99/304, 305, 306, 307, 315, 281, 282, 283

[56] References Cited
UNITED STATES PATENTS

| 1,276,774 | 8/1918 | Shailor | 99/311 |
| 1,601,987 | 10/1926 | Topper | 99/311 |
| 3,187,663 | 6/1965 | McLean | 99/306 |
| 3,333,964 | 8/1967 | Bender | 99/306 |

*Primary Examiner*—Robert W. Jenkins
*Attorneys*—Charles R. Miranda and Burtsell J. Kearns ABSTRACT: An automatic infusion brew maker comprising a pair of reservoirs and a pair of heat pumps connected thereto. The two heat pumps are driven by a common electrical heating means. Water from the first reservoir is pumped into a removable steeping basket, passes through a filter and exits through an outlet below the steeping basket. Water from the second reservoir is heated and pumped directly to the steeping basket outlet, thus bypassing the material to be steeped.

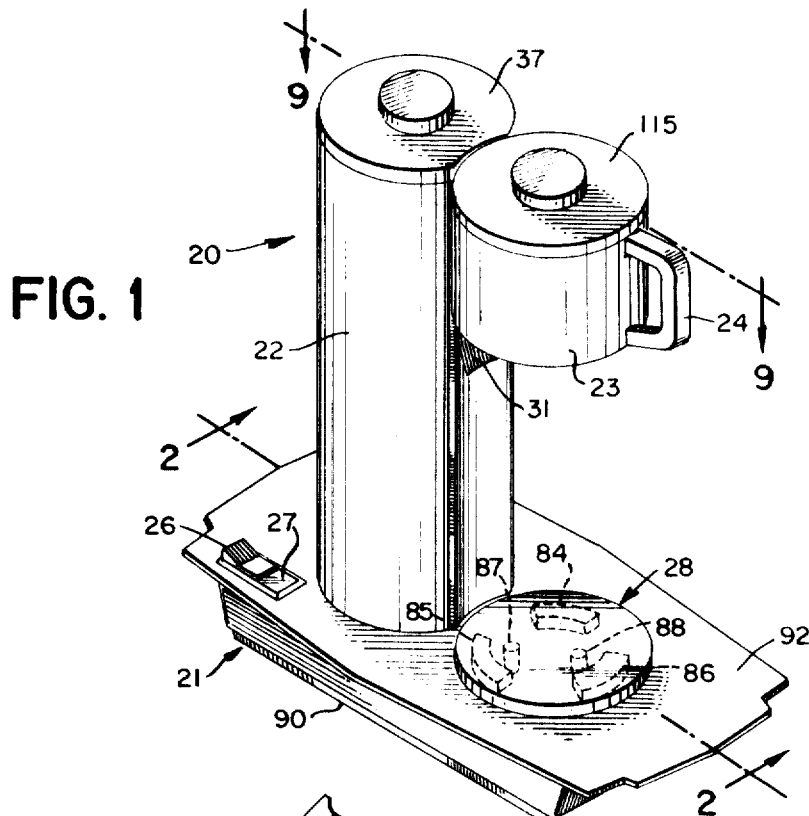
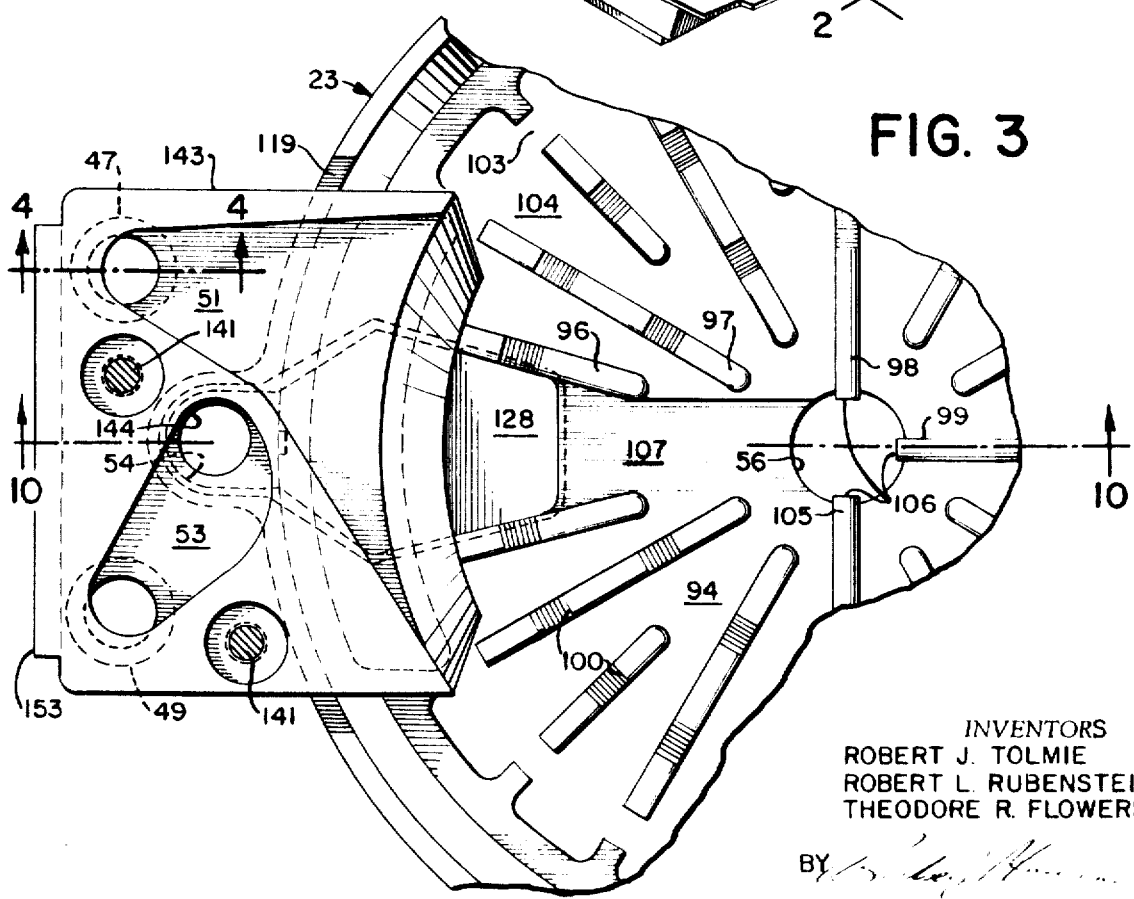

TO CHECK VALVE 41
TO CHECK VALVE 39

INVENTORS
ROBERT J. TOLMIE
ROBERT L. RUBENSTEIN
THEODORE R. FLOWERS

BY

INVENTORS
ROBERT J. TOLMIE
ROBERT L. RUBENSTEIN
THEODORE R. FLOWERS

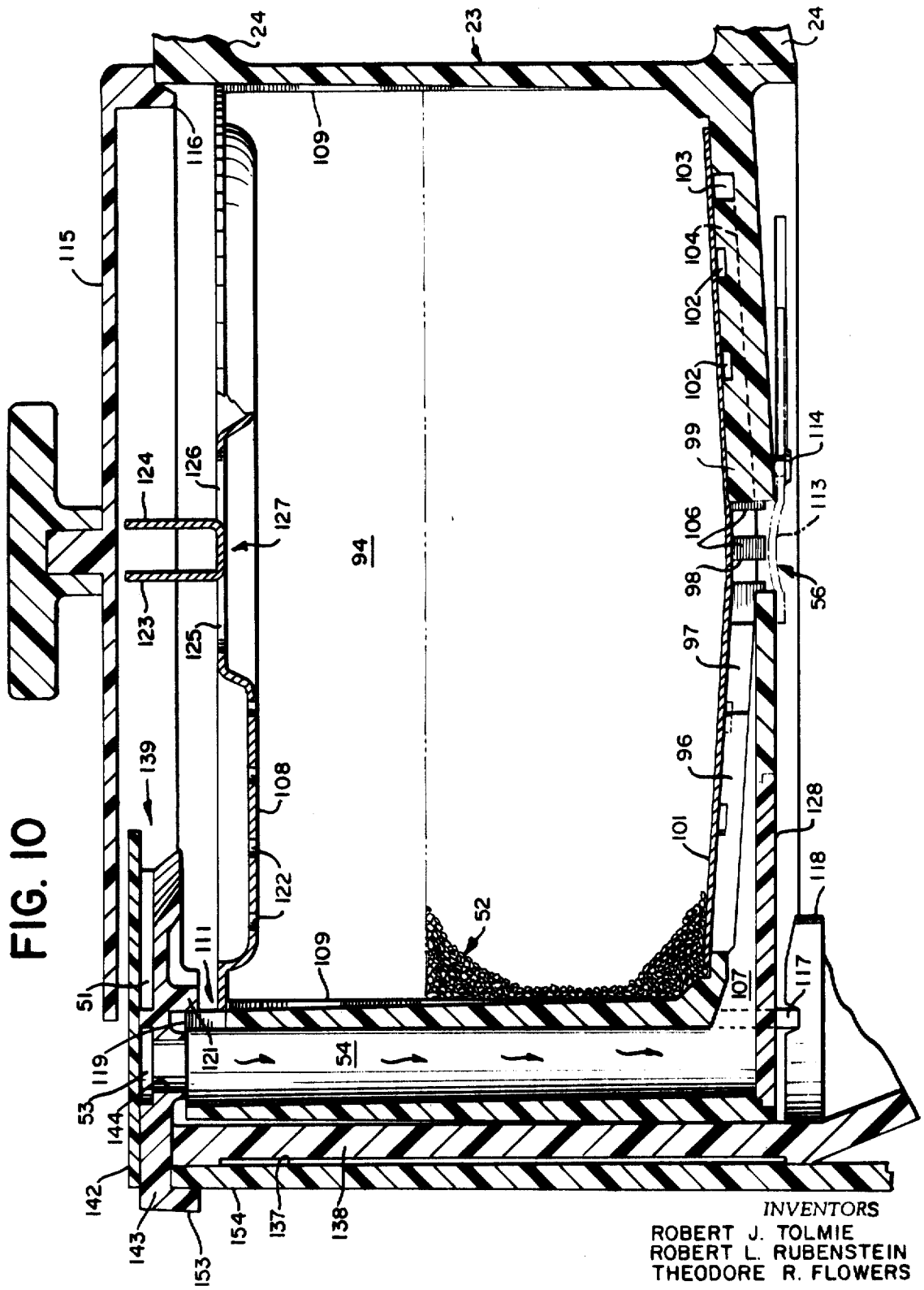
FIG. 10
INVENTORS
ROBERT J. TOLMIE
ROBERT L. RUBENSTEIN
THEODORE R. FLOWERS
BY 

AUTOMATIC INFUSION BREW MAKER

BACKGROUND OF THE INVENTION

This invention relates to new and useful improvements in automatic infusion brew makers and more particularly, to automatic electric home coffee makers.

Home coffee makers whether of the top of the stove or the automatic variety (that is those which contain an electrical heating element) are limited in the range of fillings over which they will produce good coffee. That is, an eight-cup coffee maker will make a satisfactory brew of between five and eight cups, but will not produce satisfactory coffee when an attempt is made to make only two to four cups in the pot. This is true no matter what form the coffee maker takes whether it be a drip pot, percolator or filter type. One reason for this is the great variation in the time in which coffee grounds are steeped by the water supplied to them during the infusion process.

It has been found for example that for drip grind coffee the grounds should be steeped for 4 to 6 minutes in water having a temperature between 185 and 203° F. Contrary to what might be expected a very wide range of volume of coffee may be brewed by infusing a relatively small quantity of hot water through a correspondingly widely varying volume of coffee grounds. In some drip coffee makers, according to prior art, therefore some of the water is adapted to bypass the coffee grounds and only a predetermined portion of the hot water added to the drip pot infuses the coffee grounds.

An ideal coffee brew maker able to make a large range of volumes of coffee as discussed above should be self-contained and automatic. The coffee grounds should be well filtered from the liquid brew and the total brewing time should be relatively short. Furthermore, few parts should require cleaning after use and they should be relatively easy to clean in a dishwasher.

Ideal coffee is free of grounds. Coffee filters using paper filters or the like are the best for this purpose. However, they are relatively slow in operation. In some devices the paper filter is either supported against the walls of a funnel and all of the filtered brew must exit from a small opening at the bottom of the funnel. In other devices the filter lies on a thin gratinglike support. Problems are encountered in these known devices in that the flow of brew from the filter is inhibited. It has been observed that during the filtering process brew collects in droplets on the bottom of the filter paper and such droplets may fill up the exit holes of supporting grates or may be inhibited from falling away from the paper filter until they reach very large size. In both cases the back pressure caused by the droplets of water on the underside of the filter inhibit flow of the brew through it. Furthermore, a gratinglike support requires an extra funnel beneath it (adding to its height and complexity) or very careful alignment of the receiving vessel.

OBJECTS OF THE INVENTION

It is, therefore, an object of the present invention to provide a novel automatic infusion brew maker.

Another object of the invention is to provide a novel automatic infusion brew maker capable of making an extremely wide range of quantities of brew.

Still another object of the invention is to provide an automatic infusion brew maker of the above character utilizing a single heat source for the infusion liquid heating and pumping functions.

Yet another object of the invention is to provide an automatic infusion brew maker of the above character using a single heat source for the infusion liquid heating, pumping and brew keep-warm functions.

Another object of the invention is to provide a heat pump for an automatic infusion brew make of the above character providing two independent pumping functions.

Still another object of the invention is to provide a heat pump of the above character using a single heat source.

Yet another object of the invention is to provide a heat pump for an automatic infusion brew maker of the above character providing operation of the two heat pumps in sequence.

Yet still another object of the invention is to provide an automatic electric infusion brew maker of the above character.

A further object of the invention is to provide an improved steeping basket for an automatic infusion brew maker of the above character that is small in relation to the maximum quantity of brew that can be made.

A still further object of the invention is to provide an improved steeping basket of the above character utilizing throwaway paper filters, or the like.

Yet a further object of the invention is to provide an improved steeping basket of the above character having greatly increased filter flow.

Yet a still further object of the invention is to provide a steeping basket of the above character having a small outlet or drip area for use with a detachable server.

Another object of the invention is to provide an automatic infusion brew maker of the above character in which the infusion liquid is at the proper infusion temperature, regardless of the quantity of brew being made.

Still another object of the invention is to provide an automatic infusion brew maker of the above character in which the steeping time is nearly constant, regardless of the quantity of brew being made.

Yet another object of the invention is to provide an automatic infusion brew maker of the above character in which the quantity of the infusion liquid used for steeping is nearly constant, regardless of the quantity of brew being made.

A further object of the invention is to provide an automatic electric infusion coffee brew maker of the above character.

Still further objects of the invention are to provide an automatic electric infusion coffee brew maker of the above character that is easy to operate, pleasing in appearance, easy to clean, inexpensive to manufacture and repair.

SUMMARY OF INVENTION

The present invention contemplates a novel brew maker. In one embodiment an automatic infusion brew maker comprises a water tank having two chambers or reservoirs therein which may be filled with cold water. A funnel guard is provided so that the smaller of the reservoirs is filled completely first. Any overflow water goes into the second reservoir. The two reservoirs are connected through check valves to the inlets of two independent heat pump channels which are mounted on either side of an electrical heating unit.

One channel is connected to the first reservoir which is normally filled with water and the other channel is connected to the second reservoir. When the electrical heater is connected to a source of power the water in the first channel is pumped into the top of a steeping container containing the solid material to be infused and the water from the second channel is pumped into the serving container bypassing the coffee grounds. The channels are arranged in selected spaced relationship with the heating element so that the water through heat conduction is pumped simultaneously. In another embodiment the water from the channels is pumped sequentially.

The first reservoir holds 3 cups of water and the second reservoir may hold from 0 to 7 cups of water. Three cups of water are always pumped to the steeping container in a relatively fixed amount of time well within the preferred limits for brewing coffee and at the correct coffee-brewing temperature. This steeping water floods the steeping container and, as the brew passes through the filter for the preferred brewing time, the remaining water is pumped from the second reservoir through the bypass.

The heat pumps of the present invention are preferably in heat-conducting engagement with a warming plate on which the server sits as it receives the brew from the outlet of the steeping basket. When all of the water has been pumped from both reservoirs, the heat pump rises in temperature until a thermostat is actuated cycling above the boiling point of water. Heat conduction to the warming plate is controlled to provide the proper warming-plate temperature.

The steeping container is conveniently removable from the brew maker and it and the server, which are the only elements of the brew maker touching the brew of the grounds, may conveniently be cleaned, e.g., in an automatic dishwasher.

The above and other objects and advantages of the present invention will appear more fully hereinafter from a consideration of the detailed description which follows taken together with the accompanying drawings wherein embodiments thereof are illustrated.

THE DRAWINGS

In the drawings:

FIG. 1 is a perspective view of an automatic infusion brew maker according to the present invention with the server removed;

FIG. 3 is a partial cross-sectional view taken along line 3-3 of FIG. 2;

FIG. 10 is a cross-sectional view taken along the line 10-10 of FIG. 3.

The same reference characters refer to the same elements throughout the several views of the drawings.

DESCRIPTION

Figure 2:
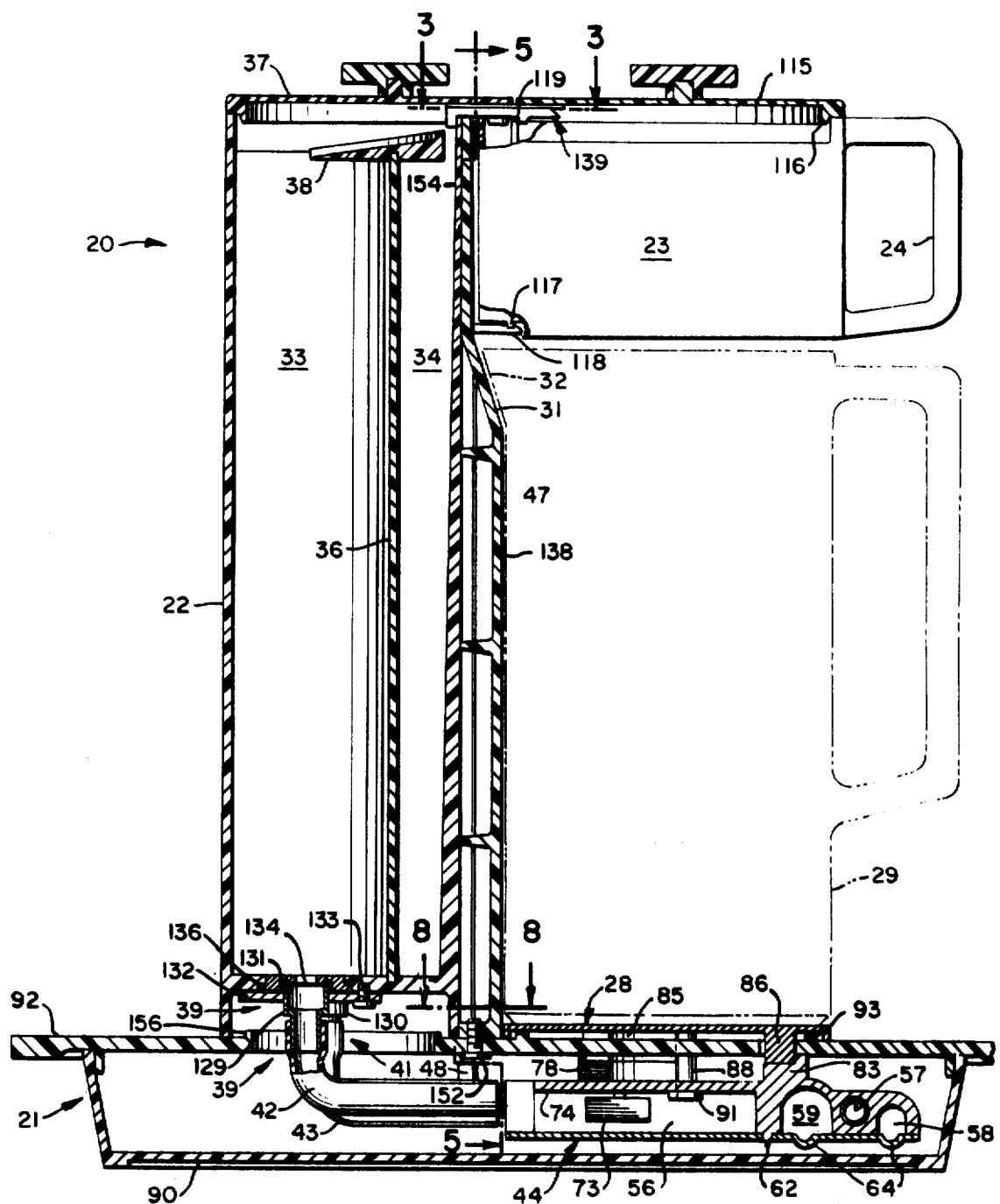
FIG. 2 is a cross-sectional view taken along plane 2-2 of FIG. 1.

A preferred embodiment of an automatic infusion brew maker for making coffee according to the invention is generally indicated at 20 in FIG. 1. It comprises a base portion 21 on which is mounted a water tank 22. Removably mounted to the side of the water tank is a grounds-steeping basket 23 which may be conveniently removed by means of a handle 24. The coffee brewer is turned on or off by means of switch 26. When it is on, a pilot light 27 is illuminated. Warming plate 28 is mounted on base portion 21 and a server 29 may be set thereon as shown in FIG. 2. The water tank 22 has a recess opening 31 for receiving the spout 32 of the server 29, as best seen in FIG. 2.

Figure 9:
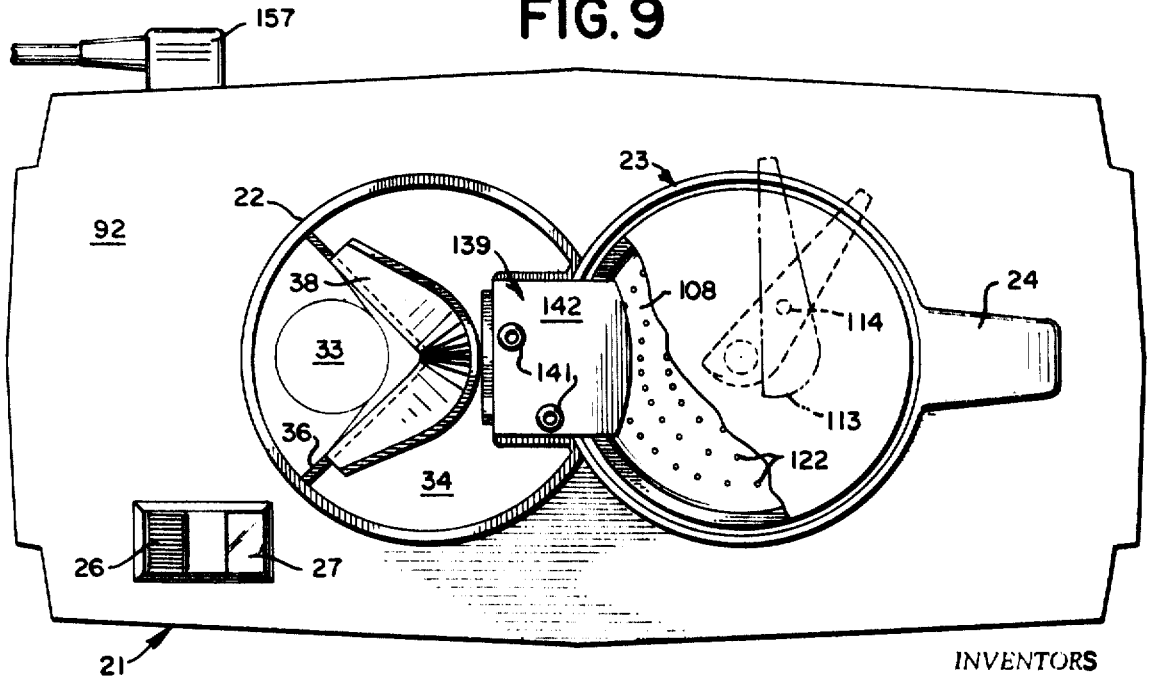
FIG. 9 is a top view taken along the line 9-9 of FIG. 1.

Now referring to FIGS. 2 and 9, the water tank 22 comprises a first chamber or reservoir 33 and a second chamber or reservoir 34 separated by a V-shaped wall 36. The first chamber 33 has a total capacity of 3 cups while chamber 34 has a total capacity of 7 cups. The chambers are filled by removing cover 37 and first filling the 3 cups chamber 33. When it is filled, the excess water over 3 cups will overflow the wall 36 and fill the second chamber 34. This operation is facilitated by a diverting funnel 38 mounted on the top of wall 36.

The water exits from the first chamber 33 (FIG. 2) through a check valve assembly, generally indicated at 39; and from the second chamber 34 through a check valve assembly, generally indicated at 41.

Still referring to FIG. 2, water from the first chamber 33 is conducted via check valve 39 and a tube 42, and water from second chamber 34 via check valve 41 and a tube 43 to a heat pump generally indicated at 44.

Figure 5:
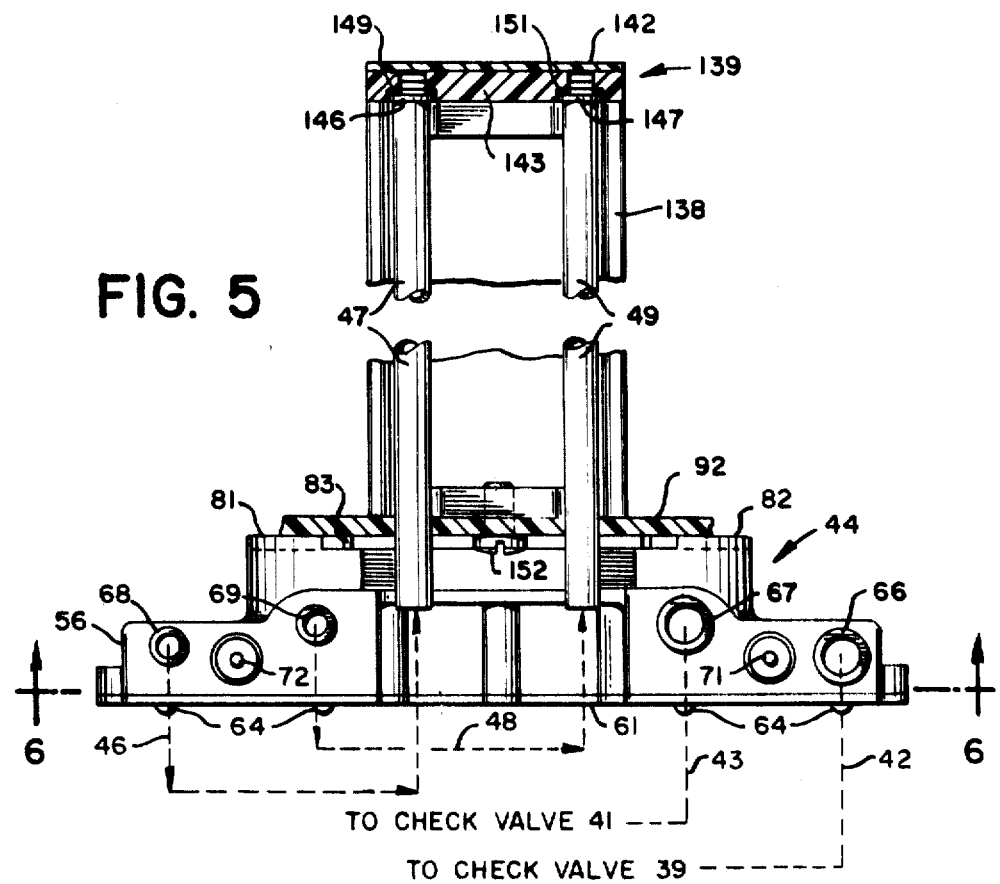
FIG. 5 is a cross-sectional view taken along the line 5-5 of FIG. 2.

Now referring to FIGS. 5 and 2, water from the first chamber 33 exiting from the heat pump 44 is conducted via tubing 46 (schematically indicated in FIG. 5) to a first riser tube 47. Water from the second reservoir 34 exiting from the heat pump 44 is similarly conducted via tubing 48 (also schematically indicated in FIG. 5) to a riser tube 49.

Figure 4:
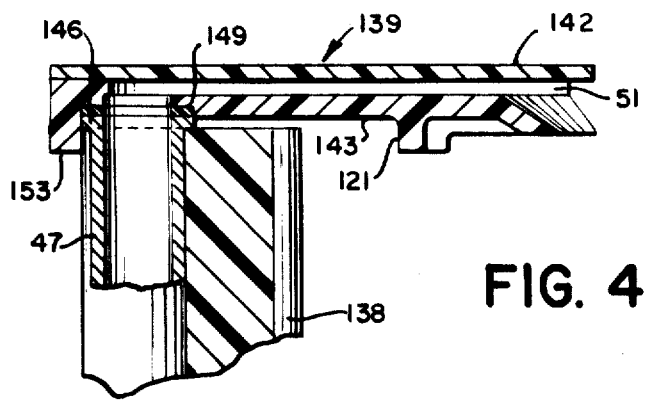
FIG. 4 is a cross-sectional view taken along the line 4-4 of FIG. 3.

Now referring to FIGS. 3, 4 and 10, water originating from the first reservoir 33 rises up riser tube 47 and is conducted through nozzle 51 into the ground-steeping basket 23 where it infuses coffee grounds 52. Water from the second reservoir 34 passes up riser tube 49, through a channel 53 shown in FIG. 3, then down through bypass channel 54 in the steeping basket 23, then through a drip outlet generally indicated at 56, and is then collected in the server 29. Thus whenever 3 to 10 cups of coffee are brewed, 3 cups of coffee are utilized to infuse the coffee grounds 52 in the steeping basket 23 and the remaining water is heated only and sent directly to the server 29.

Now referring to FIGS. 5, 6, 7 and 8, the heat pump 44 of the present invention comprises a cast metal block 56 cast around an electrical tubular sheath-type heating element 57 of the "Calrod" type. The block 56 is generally U-shaped, as is heating element 57. A pair of channels 58 and 59 are cast in block 56. The channels are sealed by means of a metal plate 61 secured to block 56 and located by means of a plurality of locating pins, as at 62 and 63. The plate may have a pair of U-shaped strengthening ribs 64 disposed at the base of channels 58 and 59 as shown.

Channel 58 is supplied with water from the first reservoir 33 at inlet 66. Channel 59 is similarly supplied with water from the second reservoir 34 at inlet 67. Water exits from channel 58 at outlet 68 and water similarly exits from channel 59 at outlet 69.

Electricity is supplied to the heating element 57 at terminals 71 and 72. A thermostat 73 is mounted to a web portion 74 of the block 56 (as best seen in FIG. 2) by bolt 76 and nut 77 (see FIGS. 6 and 8, respectively).

Thermostat 73 is of the snap-acting type and is connected in series with the heating element 57. It is set for opening and closing temperatures above the boiling point of water as selected.

Figure 8:
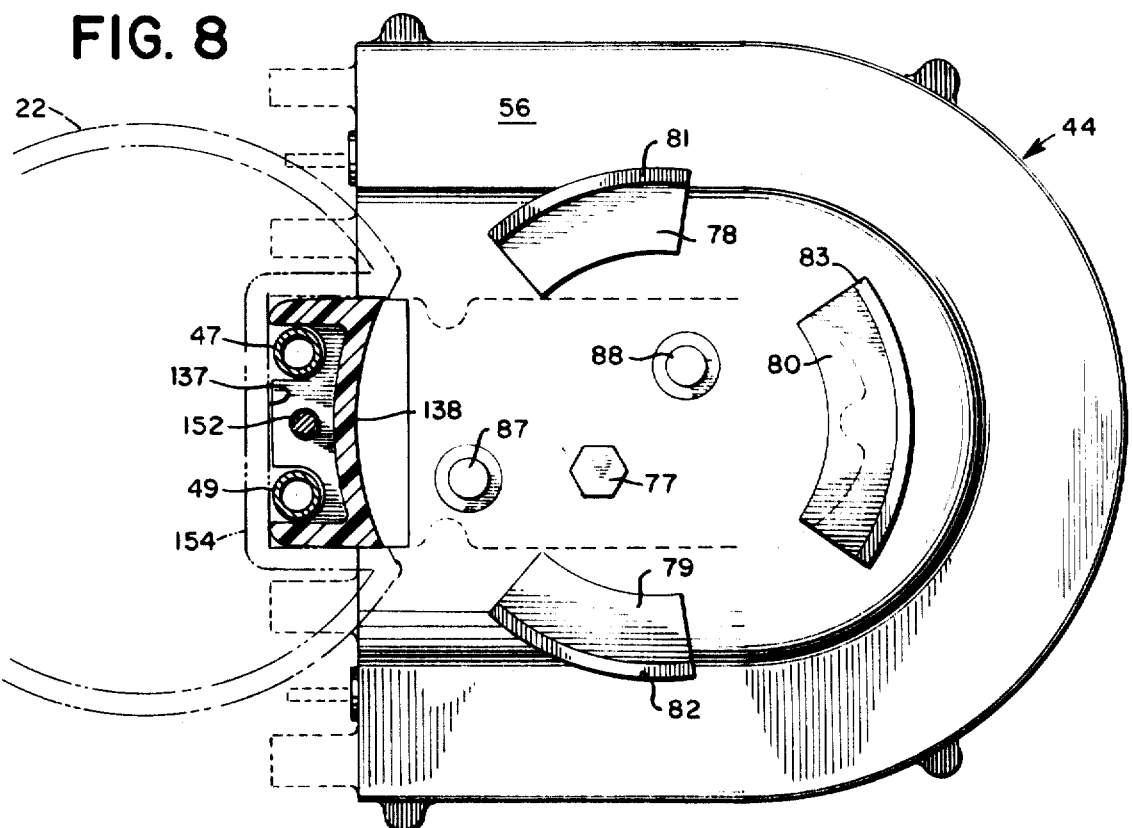
FIG. 8 is a top view of the assembly of FIG. 7 and a partial cross-sectional view taken along the line 8-8 of FIG. 2 showing the relationship of parts when the automatic infusion brew maker of FIG. 1 is assembled.

Now specifically referring to FIGS. 2 and 8, web portion 74 of block 56 has three arcuately arranged raised bosses 78, 79 and 80, each of which is provided with a further raised arcuate abutment 81, 82 and 83, respectively.

Figure 6:
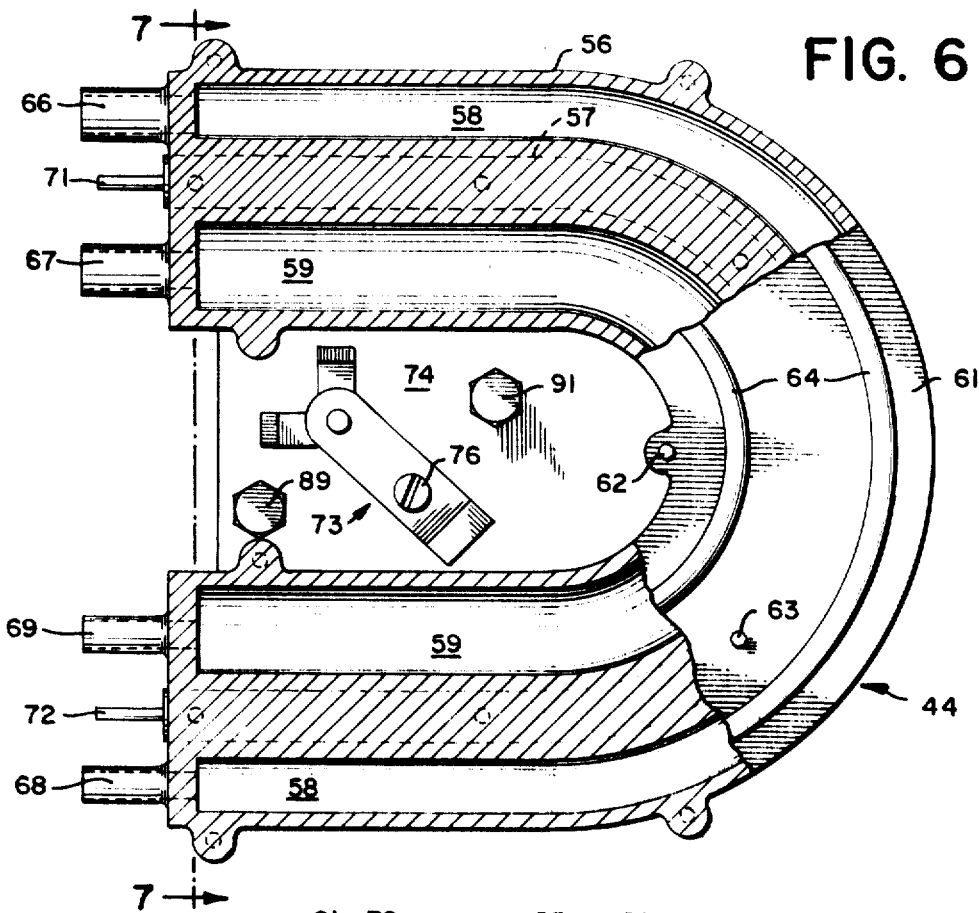
FIG. 6 is a partial cross-sectional view, partially cut away, taken along the line 6-6 of FIG. 5.
Figure 7:
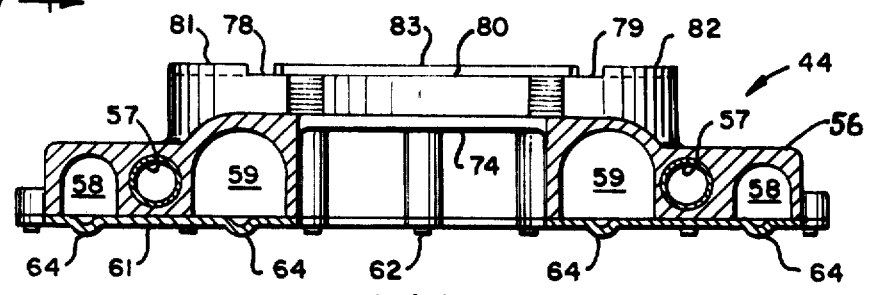
FIG. 7 is a cross-sectional view taken along the line 7-7 of FIG. 6.

Now referring to FIGS. 1 and 2, warming plate 28 of die-cast metal is provided with three downwardly depending bosses 78, 79 and 80, respectively, of the heat pump 44. Warming plate 28 is connected to heat pump 44 by means of two pins 87 and 88 which pass through web portion 74 of block 56 and are affixed thereto by means of nuts 89 and 91 (FIG. 6).

Again referring to FIGS. 1 and 2, top plate 92 of base portion 21 is clamped between warming plate 28 and heat pump 44, thus firmly affixing both of these elements to it. A circular upstanding dam 93 is provided to prevent any water passing under the peripheral edge of the warming plate 28 from coming in contact with the hot heat pump 44.

The bosses are chosen to be of the proper size and of material having the proper heat conductivity to keep warming plate 28 at the warming temperature desired when the thermostat 73 is cycling above the boiling point of water.

The bottom 90 of base portion 21 is assembled to top plate 92 by means of screws which are not shown in the drawings.

Now referring to FIGS. 3 and 10, the grounds-steeping basket 23 comprises a steeping chamber 94 for the coffee grounds 52 and the steeping water. The steeping chamber is provided with a plurality of upstanding ribs, as at 96 and 97 and 98 and 99 for supporting a paper filter 101, or the like. The ribs 96—99 are of varying length so that none come too close together. This helps prevent drops of brew coming off the filter 101 from bridging the gaps between them. Ribs 96—

99 are further provided with a plurality of relieved cut openings, as at 102 in rib 99 (FIG. 10). We have found that water droplets will more quickly be removed from the filter 101 by the corners indicated by the reference numeral 100 (FIG. 3) thus provided. A deep circular channel 103 down to the bottom surface 104 between the ribs 96—99 is provided near substantially the entire periphery of the filter 101. Channel 103 and openings 102 allows air to circulate freely among the ribs preventing water droplets that may bridge a gap between ribs from being held there by air pressure. All of the drops of brew from the filter 101 flow down the surface 104 to the brew outlet 56. To help prevent a buildup of drops along the edge of outlet 56, ribs 98 and 99 and 105 extend into outlet 56. Squared-off corners are provided adjacent the ends 106 of ribs 98 and 99 and which corners provide means for the drops to flow down.

Referring specifically to FIG. 10, water entering the bypass 54 of the brew basket 23 flows under the filter 101 through a passage 107 to outlet 56. Thus the brew and the bypass water both exit through a small opening and will not miss the server 29 even if it is not placed squarely on the warming plate 28 (FIGS. 1 and 2).

Steeping basket 23 is provided with a grounds cover 108, resting on ribs 109 formed in the interior wall of the grounds chamber 94 thereof. Grounds cover 108 functions in a usual manner to prevent grounds from floating up spilling out of the grounds basket 23 and for spreading the water from nozzle 51 over the coffee grounds. The brewer is designed such that 3 cups of water are supplied to the grounds chamber 94 and normally the latter will not overfill the same. If, however, for any reason water does overflow the grounds chamber 94 an opening 111 is provided so that this overflow flows into by pass 54.

A drip-preventing valve 113 mounted on a pin 114 is provided for opening and closing outlet 56 so that when the coffee is brewed outlet 56 maybe closed and further drippings will not fall on the warming plate 28 when the server 29 is removed.

Now referring to FIGS. 1 and 2, the top 115 of the grounds-steeping basket 23 is provided with a conical inner rim 116 so that it may also be placed on the server 29 for table use.

The entire grounds-steeping basket 23 may be removed from the brew maker 20 by lifting handle 24 upwardly, rotating the basket 23 in the counterclockwise direction as seen in FIGS. 1 and 2. As best seen in FIGS. 2 and 10, this will allow an annular boss 117 to be removed from an annular hook 118 then the upper end of the rim 119 of the grounds basket 23 may be disengaged from a depending annular hook 121 and the entire basket 23 removed.

The entire brew maker 20 is largely made of a plastic material such as polysulfhone which is heat resistant and resistant to coffee stains. The server 29 may be of ceramic material. The cast elements such as the block 56 and the keep-warm plate 28 are die-cast aluminum or the like. Risers 47 and 49 may be aluminum tubes and grounds cover 108 may be stamped of aluminum.

The grounds cover has a plurality of water holes 122 therein (FIGS. 9 and 10); a pair of wings 123 and 124 are bent up in the center to act as a handle. Because of the large openings 125 and 126 thus formed, the center portion 127 of the grounds cover 108 is raised so that any overflowing that might occur will occur through the small holes 122 and thus not carry grounds into the bypass 54.

Still referring to FIG. 10, the steeping basket 23 is provided with a plug 128 to facilitate its casting, the plug being permanently sealed in at the factory.

Referring to FIG. 2, check valves 39 and 41 comprise metal tubes 129 and 130 having flanges 131 thereon (only one of which is shown) so that they can be clamped by means of a metal plate 132 and screws 133 (only one of which is shown) to the water tank 22. Both check valves include an elastomer flapper valve 134, the outer portion of which is clamped between flange 131 and the tank 22. The smaller first portion 33 of the reservoir has an insert 136 in which the flapper valve 134 is set. This insert is provided for casting purposes and is permanently sealed in the water tank 22 at the factory.

Now referring to FIGS. 1 through 5, 8 and 10, the water tank 22, as best seen in FIG. 8, is provided with a recess 137 into which is fitted an insert 138. As best seen in FIGS. 3, 4 and 5, a nozzle assembly 139 is affixed to insert 138 by means of a pair of screws 141 (FIG. 9). The top 142 of nozzle assembly 139 is permanently sealed to the bottom portion 143 thereof at the factory. The bottom portion 143 provides nozzle 51 and bypass channel 53, as best seen in FIG. 3. The bottom portion 143, as best seen in FIG. 10, includes the annular hook 121 and an opening 144 into bypass 54.

Now referring to FIGS. 4 and 5, riser tubes 47 and 49 are provided with annular rims 146 and 147 and ring seals 149 and 151, these assemblies being clamped between bottom portion 143 and insert 138. The riser tubes 47 and 49, as best seen in FIG. 5, pass through the insert 138 and through holes (not shown) in top plate 92 of base portion 21. Tubes 42, 43 46 and 48 connecting the heat pump 44 to the riser tubes 47 and 49 and to the water tank 22 (FIG. 2) are preferably formed of silicone rubber tubing, cast boots, or the like.

Now referring to FIGS. 1, 2 and 10, the water tank 22, nozzle assembly 139 and insert 138 are affixed to top plate 92 of the base portion 21 by means of a single screw 152. The nozzle assembly 139 is first affixed to insert 138 by means of screws 141 (FIG. 9), then an annular hook 153 on the bottom portion 143 of the nozzle assembly 139 is hooked over recessed wall 154 of the tank 22. Screw 152 then firmly clamps the entire assembly to the top plate 92. A circular dam 156 is provided underneath the water tank 22 to prevent any water entering under the water tank from getting into the base portion 21 where it might adversely affect electrical and hot parts therein.

The divider 36 is permanently sealed in water tank 22 and diverting funnel 38 is permanently sealed to divider 36. Power is supplied to the brew maker 20 by means of a removable cord set 157 fitting into a recess receptacle (not shown) in the base portion 21. The receptacle, the switch 26, the thermostat 73, and the heater 57 are all connected in series. The pilot light 27 is connected across the switched power conductors.

OPERATION OF THE Brew MAKER

The operator fills the water tank 22 with 2 or more cups of water. If 2 to 3 cups of coffee are being made, the first reservoir 33 of the water tank 22 will, when the appliance is turned on, be pumped out by means of the pump 44; the water passing through channel 58 thereof. If more than 3 cups of coffee are being made, the overfill water will be retained in the second water reservoir 34 of the water tank 22.

It will be noted that the cross-sectional areas and the volumes of the two channels 58 and 59 of the heat pump shown in FIG. 6 are quite different. If both channels are filled with water and the heater 57 is initially turned on, water will boil in the channel 58 and channel 59 at each side of heater 57 at approximately the same time. Due to the large surface area heated, however, the contents of channel 59 pump at a faster rate than channel 58. When steam bubbles are formed within the channel 58, for example, check valve 39 connected therewith will close and water will be forced up riser tube 47 into the steeping chamber 94 (FIG. 10). The formation of the steam bubbles on the walls of channel 58 (steam being a poor heat conductor) will stop the boiling of the remaining water in the channel 58. Some of the steam therein will then condense causing a partial vacuum. The inlet 66 to channel 58 is deliberately larger than the outlet 68 as shown in FIG. 6 so that this partial vacuum will draw additional cold water from the reservoir 33 more readily than hot water from the riser tube 47. The cool water will be heated to boiling point, steam bubbles will form and the process will be repeated.

As channel 58 is pumped dry, heat is also absorbed by the contents of channel 59 and a similar pumping is effected until the second reservoir 34 is emptied the hot water passing through the bypass 54 in the steeping basket (see FIG. 10), as previously explained.

When both channels 58 and 59 are pumped dry, the temperature of the heat pump 44 rises sharply at which point thermostat 73 cuts off power to the heating element. The thermostat 73 thereafter cycles and maintains the pump temperature a level higher than that required for pumping action, i.e., above the boiling point of water. The bosses 85, 86 and 87 on the keep-warm plate bleed sufficient heat to the plate to perform the keep-warm function.

Figure 11:
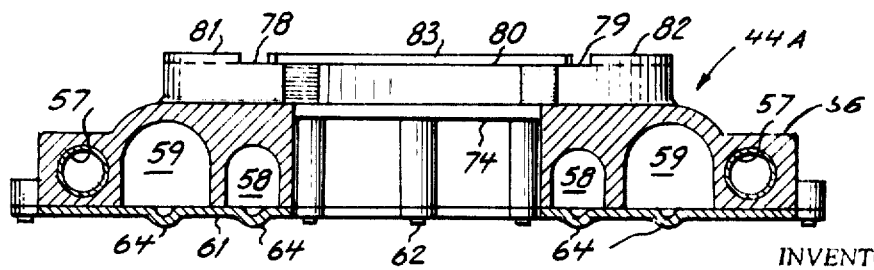
FIG. 11 is a view similar to FIG. 7 and illustrates another embodiment of the present invention.

In FIG. 11 is shown a further embodiment of the pump means of the present invention. As mentioned it is a further feature of this invention to provide pump means including two heat pumps operating in sequence. To this end pump means are provided and indicated generally in FIG. 11 by the reference numeral 44A. Pump means 44A is adapted for use in brew maker 20 and in FIG. 11 corresponding reference numerals have been applied to like elements previously described.

As seen in FIG. 11 the U-shaped heating element 57 is provided in block 56 to extend about the periphery thereof. U-shaped channels 58 and 59 are arranged between the arms of element 57 with channel 59 interposed between and spacing channel 58 from heating element 57. The water input and output connections between channels 57-58 with reservoirs 33-34 and steeping basket 23 respectively and the circuitry for operating element 57 are identical to that previously described.

In accordance with this arrangement the heat of the element 57 is conducted through block 56 first to the contents of channel 59 where the latter is pumped first to the coffee basket 23 with the cold water entering the channel 59 inhibiting boiling of the water in channel 58. After the channel 59 is pumped dry emptying the contents of reservoir 34, full heat is absorbed by channel 58 and the second reservoir 33 is emptied as the channel is pumped dry. When both channels 58 and 59 are pumped dry in sequence as described the thermostat 73 cuts off power and operates in the manner previously described. In this manner the selective positioning of one channel between the heating element 57 and another channel and by preselecting the distances between channels the sequence of pumping and the rates thereof is predetermined.

It will thus be seen that we have provided an automatic infusion brew maker capable of providing brew of consistently high quality. We have achieved this by pumping up to a fixed quantity of infusion liquid into the steeping basket while bypassing the remaining liquid. We have provided a novel single heating element heat pump for providing both of these pumping functions either simultaneously or in sequence such that the steeping-basket liquid is pumped first and the bypass liquid secondly or at the same time as desired. Furthermore, means are provided for close control of the steeping time over the wide range of volumes of brew which can be made.

We have further greatly reduced the size of the steeping basket since only up to a fixed quantity of water needs to pass therethrough, thus providing a compact unit which is pleasing to the eye. We have further achieved this compactness in the steeping basket by providing relatively narrow channels under a paper filter or the like. We have reduced the possibility of spilled brew by providing a single small outlet to a brew-receiving server and a value for closing the same at the end of operation of the brew maker. We have at the same time greatly increased the flow in such a compact filter unit with a single small outlet by providing ribs in contact with the filter having recesses cuts therein providing sharp corners to guide drops of brew down away from the filter. Also, we have provided a large circumferential channel for good airflow to and between the various interstices of the ribs, some of the ribs being continued to the brew outlet to provide sharp corners depending from the filter again aiding in fast removal of droplets therefrom.

By the above means we have further achieved a brew maker construction largely using plastic parts in which no metallic parts are in contact with the brew and in which only a single removable steeping basket requires cleaning.

We have further achieved a brew maker which may be easily assembled and disassembled for repair and may be manufactured in large quantities at small cost.

It will thus be seen that the objects set forth above, among those made apparent from the preceding description, are efficiently attained and, since certain changes may be made in the above construction and articles without departing from the scope of the invention, it is intended that all matter contained in the above description are shown in the accompanying drawings shall be interpreted as illustrative and not in a limiting sense.

Those skilled in the art will understand, for example, that other brews and infusions such as tea and mate could be made in brew makers according to our invention. Also, heat pumps according to our invention could have three or more sequentially operating pumping channels.

Having described our invention, what we claim as new and desire to secure by Letters Patent is:

1. An infusion brew maker comprising:
  A. a first and a second reservoir of liquid to be infused;
  B. a container for material to be steeped;
  C. a filter for separating brew from the steeped material;
  D. means for combining the brew with liquid from one of said reservoirs that has not been infused; and,
  E. a pair of pumps
    a. one arranged to pump liquids from the first of said reservoirs into said steeping container, and
    b. the other arranged to pump liquid from the second of said reservoirs to said combining means.

2. The infusion brew maker of claim 1 wherein:
  a. said first reservoir has a relatively small capacity and said second reservoir has a relatively large capacity, and
  b. said first reservoir is connected to supply infusion liquid to said steeping container; and said automatic infusion brew maker further comprising:
  F. inlet means to said first reservoir; and
  G. outlet overfill means leading from said first reservoir to said second reservoir whereby said first reservoir is filled to a predetermined quantity of liquid before said second reservoir is filled.

3. The infusion brew maker of claim 1 wherein said pumps are heat pumps comprising:
  a. heat conductive material forming a pair of channels
    i. in heat conducting relation with each other, and
    ii. shaped and arranged such that when both said channels are filled with a liquid and said material is heated, the liquid in both of said channels is pumped.

4. The infusion brew maker of claim 3 and:
  F. a serving vessel arranged to receive the combined liquids pumped from said reservoirs, and
  G. a warming plate on which said serving vessel sits while receiving said liquids, said plate being in heat-conducting relation with said material.

5. The infusion brew maker of claim 3 wherein said first channel is of smaller volume than said second channel.

6. the infusion brew maker of claim 3 wherein the surface-to-volume ratio of said first channel is greater than that of said second channel.

7. The infusion brew maker of claim 3 and:
  F. an electrical heating element
    a. mounted in heat-conducting relation with said heat-conductive material.
    b. said material being cast around said heating element in the form of a block, and
    c. said channels being formed in said block.

8. The heat pump of claim 1 and:
  B. a heating element mounted in heat-conducting relation with said material.

9. The infusion brew maker of claim 1 and:

F. an infusion basket therefor comprising means for supporting a paper filter, or the like, said means arranged above a funnellike base having a central discharge opening therein, said means having outside corners depending from said filter toward said funnellike base.

10. The infusion brew maker of claim 9 wherein said infusion basket is removably mounted on one of said reservoirs.

11. The infusion brew maker of claim 9 wherein said pumps are heat pumps comprising:
   a. heat-conductive material forming a pair of channels
      i. in heat-conducting relation with each other, and
      ii. shaped and arranged such that when both of said channels are filled with a liquid and said material is heated the liquid in said channels is pumped.

12. The infusion brew maker of claim 9 wherein said is provided a substantially circumferential channel between said filter and said base near the outer circumference of said filter.

13. The infusion brew maker of claim 9 wherein:
   a. said supporting means takes the form of radial ribs upstanding from said base,
   b. and said outside corners are formed by cuts in the top surfaces of said ribs.

14. The infusion brew maker of claim 9 and:
B. valve means for closing said discharge opening.

15. The infusion brew maker of claim 9 and:
B. a bypass channel in said infusion basket for receiving liquid from said second reservoir and for directing it to said discharge opening without passing through said paper filter.